United States Patent
Khosravani et al.

(10) Patent No.: US 10,603,844 B2
(45) Date of Patent: Mar. 31, 2020

(54) APPARATUS AND METHODS FOR INJECTING FILLER MATERIAL INTO A HOLE IN A COMPOSITE LAYER

(71) Applicant: The Boeing Company, Chicago, IL (US)

(72) Inventors: Shahriar Khosravani, Everett, WA (US); Blake A. Simpson, Kent, WA (US); Darrin M. Hansen, Seattle, WA (US); Mark J. DuFour, Marysville, WA (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 15/786,665

(22) Filed: Oct. 18, 2017

(65) Prior Publication Data

US 2019/0111632 A1    Apr. 18, 2019

(51) Int. Cl.
*B05C 7/06*    (2006.01)
*F16B 17/00*    (2006.01)
(Continued)

(52) U.S. Cl.
CPC ........ *B29C 65/542* (2013.01); *B22D 17/2023* (2013.01); *B22D 17/30* (2013.01); *B22D 19/04* (2013.01); *B22D 41/50* (2013.01); *B22D 41/60* (2013.01); *B29C 65/40* (2013.01); *B29C 70/745* (2013.01); *B29C 70/88* (2013.01);
(Continued)

(58) Field of Classification Search
CPC ......... B05C 7/06; B05C 11/1039; F16B 1/00; F16B 17/00; F16B 29/00; F16B 2200/10; H05K 3/42
See application file for complete search history.

(56) References Cited

U.S. PATENT DOCUMENTS 4,180,601 A * 12/1979 Kopis .................... B05D 7/222
427/230
4,755,904 A    7/1988 Brick
(Continued)

FOREIGN PATENT DOCUMENTS

CA    2913166 A1 *    8/2016    .............. B22F 7/062
EP    0113702 A1 *    7/1984    ........... B05C 5/0208
(Continued)

OTHER PUBLICATIONS

European Extended Search Report dated Dec. 11, 2018 in European Application No. 18198806.4 (European counterpart of the instant patent application).
(Continued)

*Primary Examiner* — Robert B Davis
(74) *Attorney, Agent, or Firm* — Ostrager Chong Flaherty & Broitman P.C.

(57) ABSTRACT

Apparatus and methods for injecting molten filler material into a hole. The method in accordance with one embodiment comprises: drilling a hole in a composite layer; heating filler material comprising an electrically conductive low-melting alloy to a molten state; inserting a nozzle having an internal channel system into the hole with a gap separating the nozzle and the hole; forcing molten filler material into, through and out of the internal channel system of the nozzle and into the gap; and retracting the nozzle from the hole. The nozzle may be rotary or not rotary.

21 Claims, 17 Drawing Sheets

(51) Int. Cl.
*B29C 65/54* (2006.01)
*B29C 65/40* (2006.01)
*B22D 17/30* (2006.01)
*B22D 17/20* (2006.01)
*B29C 70/74* (2006.01)
*B22D 41/50* (2006.01)
*B22D 19/04* (2006.01)
*B29C 70/88* (2006.01)
*B22D 41/60* (2006.01)
*F16B 1/00* (2006.01)
*F16B 19/02* (2006.01)

(52) U.S. Cl.
CPC ............. *F16B 1/00* (2013.01); *F16B 19/02* (2013.01); *F16B 2001/0064* (2013.01)

(56) References Cited

U.S. PATENT DOCUMENTS

| | | | |
|---|---|---|---|
| 4,891,732 A * | 1/1990 | Jones | F16B 37/044 |
| | | | 361/218 |
| 4,951,849 A * | 8/1990 | Townsend | B05C 7/00 |
| | | | 222/523 |
| 5,942,147 A | 8/1999 | Yoshino et al. | |
| 6,729,531 B2 | 5/2004 | Stevenson et al. | |
| 8,475,102 B2 * | 7/2013 | Haylock | B64D 45/02 |
| | | | 411/361 |
| 8,651,413 B2 * | 2/2014 | Kashiwagi | B64D 45/02 |
| | | | 204/196.18 |
| 2003/0152699 A1 | 8/2003 | Someno et al. | |
| 2003/0160109 A1 | 8/2003 | Byrnes et al. | |
| 2010/0329802 A1 * | 12/2010 | Wada | B23B 35/00 |
| | | | 408/1 R |
| 2013/0099490 A1 | 4/2013 | Kwon et al. | |
| 2014/0263480 A1 * | 9/2014 | Nelson | B05C 17/00513 |
| | | | 222/568 |
| 2016/0229552 A1 | 8/2016 | Gross et al. | |

FOREIGN PATENT DOCUMENTS

| | | | | |
|---|---|---|---|---|
| EP | 3053679 A1 | 8/2016 | | |
| JP | H0682930 B2 * | 10/1994 | | H05K 3/42 |
| WO | 9728917 A1 | 8/1997 | | |

OTHER PUBLICATIONS

Examination Report dated Dec. 19, 2019 in European Application No. 18198806.4 (European counterpart of the instant patent application).

* cited by examiner

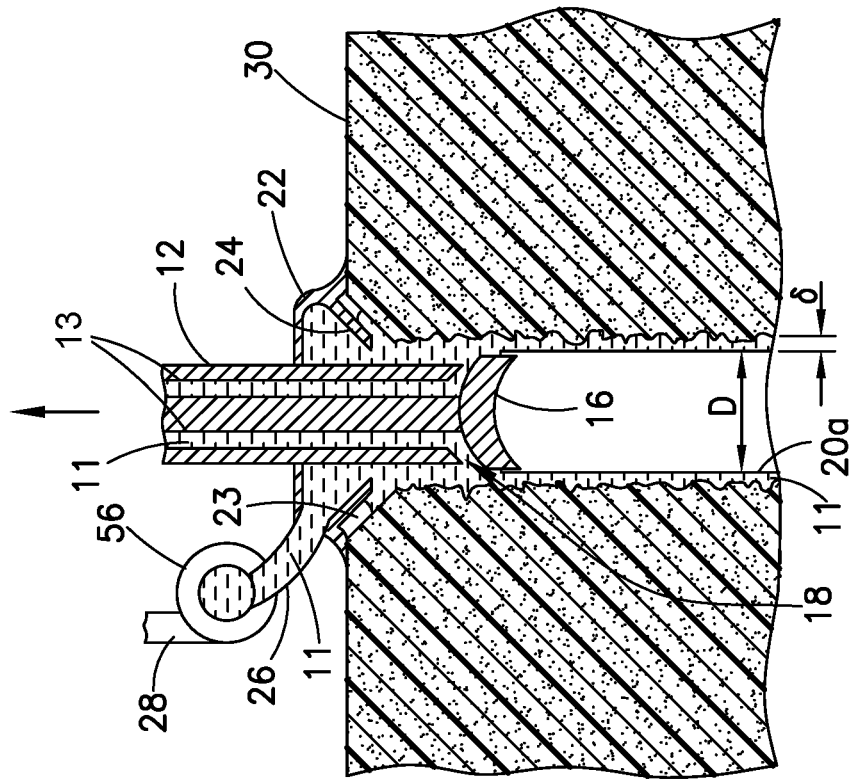
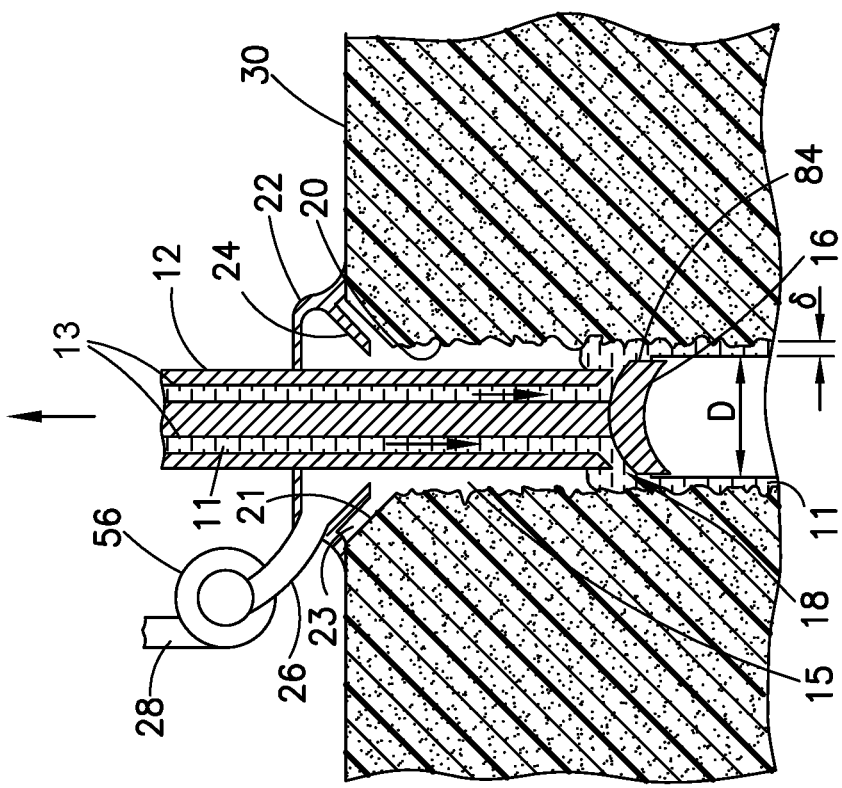

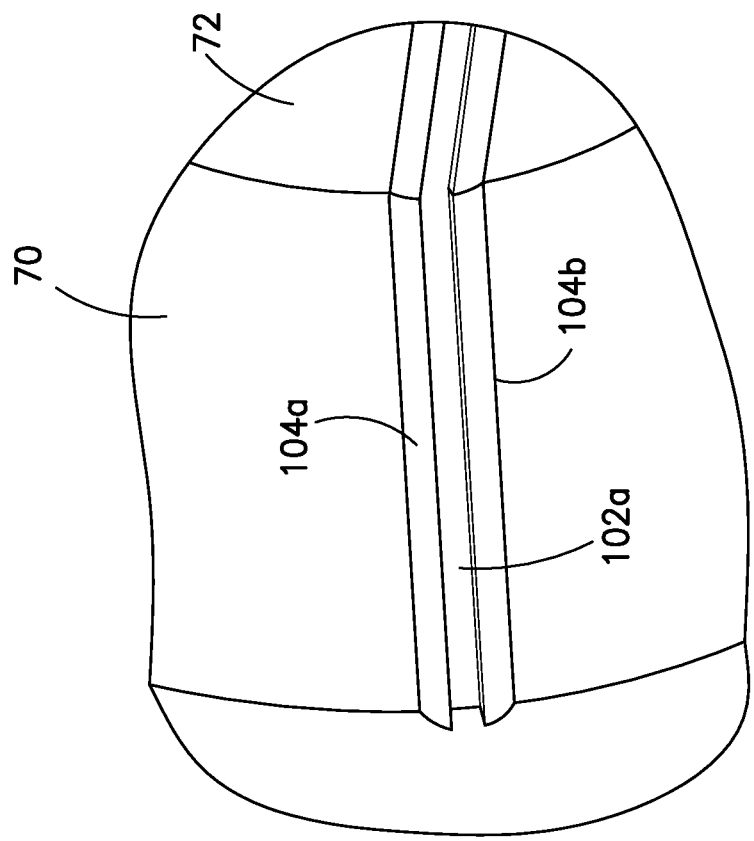
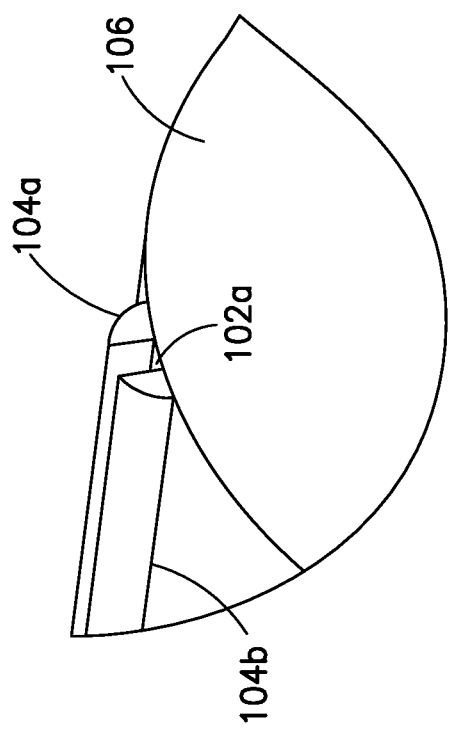
FIG. 5B
FIG. 5A

Table 1: Sample composition

| Sample | Liquid Ga alloy | Metal powder/film | Material elemental weight ratio |
|---|---|---|---|
| Ga/Sn–Ni | Ga/Sn | Ni | 58.4 Ga: 7.2 Sn: 34.3 Ni |
| Ga/In–Ni#1 | Ga/In | Ni | 52.3 Ga: 17 In: 30.7 Ni |
| Ga/In–Ni #2 | Ga/In | Ni | 50.9 Ga: 16.5 In: 32.6 Ni |
| Ga/In/Sn–Ni | Ga/In/Sn | Ni | 43 Ga: 14.8 In: 11 Sn: 31.2 Ni |
| Ga/Sn–Cu | Ga/Sn | Cu | 60.5 Ga: 7.5 Sn: 32 Cu |
| Ga/In–Cu | Ga/In | Cu | 49.5 Ga: 16.1 In: 34.4 Cu |
| Ga/In/Sn–Cu | Ga/In/Sn | Cu | 43.6 Ga: 15 In: 11.2 Sn: 30.3 Cu |
| Ga/In–Ag | Ga/In | Ag | 43 Ga: 14 In: 43 Cu |
| Ga/In–bronze | Ga/In | $Sn_5Cu_{84}$ bronze | 49.4 Ga: 16 In: 3.5 Sn: 31.2 Cu |
| Ga/In/Sn–bronze | Ga/In/Sn | $Sn_5Cu_{84}$ bronze | 43.4 Ga: 14.9 In: 14.2 Sn: 27.5 Cu |

FIG. 10

APPARATUS AND METHODS FOR INJECTING FILLER MATERIAL INTO A HOLE IN A COMPOSITE LAYER

BACKGROUND

This disclosure generally relates to the use of fasteners to secure two or more structures or workpieces (at least one of which is made of composite material, such as fiber-reinforced plastic) in a manner such that high interference fit of the fasteners within their respective holes in the structures is achieved. In particular, this disclosure relates to apparatus and methods for fastening a layer of composite material to another layer of material using an interference fit fastener assembly having a bolt or a pin and a mating part (e.g., a nut or a collar).

As used herein, the category "mating parts" comprises internally threaded nuts and collars and swaged collars. As used herein, the category "fasteners" includes bolts and pins. As used herein, the term "external projections" should be construed broadly to encompass at least the following types: (1) external threads and (2) external annular rings. As used herein, the term "hole" means a surface that bounds a space having openings at opposing ends. In the context of fiber-reinforced plastic material, the surface bounding the space may be formed by resin and fibers.

At least one method for fastening multiple layers of material together is to clamp up the layers, drill holes, and then insert some type of fastener into the holes and thereby secure the layers together. The fasteners are usually inserted in a net or clearance fit in the receiving holes in the layers. For many applications, this will be sufficient. However, when the assembled structure is subjected to cyclic loading, the looseness of the fit of the fasteners within their holes can result in continual working of the fasteners within their holes.

Additional challenges are presented when one or more of the fastened layers are made of composite material. For example, carbon fiber-reinforced plastics (CFRP) are considerably less conductive than metal. Electrical current is conducted through carbon fibers in the CFRP structure. Any discontinuity between the carbon fibers and the metallic sleeve or pin in the CFRP hole is undesirable. One way to avoid discontinuity in CFRP joints is to incorporate sleeved fasteners installed in an interference fit condition to achieve closer proximity of the carbon fiber to the fastener.

An interference fit of the fastener (hereinafter "interference fit fastener") in the hole can effectively reduce discontinuities due to cyclic loading of the assembled structure. Interference creates a tighter joint that reduces movement, resulting in enhanced fatigue performance. Additionally, interference fit fasteners can help ensure safe dissipation of electrical current.

SUMMARY

The subject matter disclosed in some detail below is directed to apparatus and methods for minimizing the variation in interference fit for sleeveless fasteners used to fasten a layer of composite material (hereinafter "composite layer") to another layer of material (e.g., a metallic layer or another composite layer), while enhancing the electrical conductivity between the fibers of the composite material and the metallic interference fit fastener. The apparatus comprises a nozzle configured to coat a hole with molten filler material. When the molten filler material solidifies, the resulting coated hole will have a diameter defined by the external diameter of the nozzle. This method will greatly reduce the variability of hole diameters and allow for less variation in the interference levels between the fastener and the structure (reducing process variation and allowing for increased cutter life). By pressing the electrically conductive filler material into the crevices or voids in the hole surface, the electrical conductivity will be improved as well as the fatigue life and fluid-tight properties.

Although various embodiments of apparatus and methods for minimizing interference fit variation and enhancing electrical conductivity in an interference fit fastener assembly will be described in some detail below, one or more of those embodiments may be characterized by one or more of the following aspects.

One aspect of the subject matter disclosed in detail below is a method for injecting molten filler material into a hole, the method comprising: (a) drilling a hole in a composite layer; (b) heating filler material comprising an electrically conductive low-melting alloy to a molten state; (c) inserting a nozzle having an internal channel system into the hole with a gap separating the nozzle and the hole; (d) forcing molten filler material into, through and out of the internal channel system of the nozzle and into the gap; and (e) retracting the nozzle from the hole. The nozzle is retracted until the nozzle is completely removed from the hole, following which a fastener is inserted into the hole with an interference fit. The method may further comprise heating the fastener before insertion.

In accordance with some embodiments, the method described in the preceding paragraph further comprises rotating the nozzle as molten filler material exits the nozzle. In example embodiments, the molten filler material exits the nozzle through a plurality of circumferentially distributed side openings.

In accordance with other embodiments, the molten filler material exits the nozzle during retraction of the nozzle. In one proposed implementations, the molten filler material exits the nozzle through a circumferential opening and is redirected and pushed in a direction having a radially outward component by a contoured flow-redirecting surface of the nozzle during retraction of the nozzle.

Another aspect of the subject matter disclosed in detail below is an apparatus for injecting molten filler material into a hole, the apparatus comprising: a reservoir for storing molten filler material that is electrically conductive; a pump assembly in fluid communication with the reservoir; and a nozzle in fluid communication with the pump for receiving the molten filler material pumped from the reservoir and ejecting the molten filler material. The nozzle comprises: a proximal body portion having an internal volume in fluid communication with the pump; an intermediate body portion comprising a plurality of longitudinal melt channels configured to guide molten filler material entering from the internal volume of the proximal body portion to flow parallel to a longitudinal axis of the nozzle and away from the proximal body portion; and a distal body portion comprising a flow-redirecting surface configured to divert longitudinally flowing molten filler material exiting the intermediate body portion to flow radially outward. A portion of the flow-redirecting surface of the distal body portion and a portion of the intermediate body portion define a circular circumferential orifice. In accordance with one embodiment, the apparatus further comprises: a retraction mechanism for retracting the nozzle; a control computer configured with programming for controlling a rate of rotation of the pump and a rate of displacement of the retraction mechanism during a filling operation; and a heating element disposed inside the nozzle.

In accordance with one embodiment of the apparatus described in the preceding paragraph: the intermediate body portion of the nozzle comprises an outer circumferential wall having a circular terminal portion; the portion of the intermediate body portion that partly defines the circular circumferential orifice comprises the circular terminal edge of the outer circumferential wall; and the flow-redirecting surface of the distal body portion of the nozzle is a circumferential surface of revolution having a diameter that increases continuously to a maximum diameter of the distal body portion that is greater than an outer diameter of the outer circumferential wall.

A further aspect of the subject matter disclosed in detail below is an apparatus for injecting molten filler material into a hole, the apparatus comprising: a reservoir for storing molten filler material that is electrically conductive; a pump assembly in fluid communication with the reservoir; a rotary nozzle in fluid communication with the pump for receiving the molten filler material pumped from the reservoir and ejecting the molten filler material; and a motor 60 for driving rotation of the rotary nozzle. The rotary nozzle comprises a circular cylindrical intermediate body portion having an internal channel system and a plurality of circumferentially distributed side openings that extend a length of the circular cylindrical intermediate body portion and allow molten filler material to flow radially outward from the nozzle. The plurality of side openings are either all linear or all helical. In accordance with one embodiment of the rotary nozzle, respective pairs of beveled projections are disposed at opposite edges of each side opening.

Yet another aspect is a structural assembly 5 for an aircraft, the assembly comprising: a composite layer having a hole with a relatively rough surface that has concavities; and a coating adhered to the relatively rough surface of the hole and filling the concavities, the coating defining a smooth circular cylindrical surface of a coated hole, wherein the composite layer comprises fibers made of electrically conductive material, and the coating comprises an electrically conductive low-melting alloy.

Other aspects of apparatus and methods for injecting molten filler material into a hole in a composite layer are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIGS. 1A through 1D are diagrams representing respective sectional views of a layer of composite material during four stages of a method for coating a previously drilled hole in the composite material and then inserting a fastener into the coated hole in accordance with one embodiment.

FIG. 4A is a diagram showing a portion of the nozzle depicted in FIG. 4 on a magnified scale, which portion is indicated by the circle 4A in FIG. 4.

FIG. 5A is a diagram showing a portion of the nozzle depicted in FIG. 5 on a magnified scale, which portion is indicated by the circle 5A in FIG. 5.

FIG. 5B is a diagram showing a portion of the nozzle depicted in FIG. 5 on a magnified scale, which portion is indicated by the circle 5B in FIG. 5.

FIG. 10 is Table 1 listing sample compositions of filler materials comprising gallium-based alloys of liquid metal combined with a pure solid metal or with a solid metal alloy.

Reference will hereinafter be made to the drawings in which similar elements in different drawings bear the same reference numerals.

DETAILED DESCRIPTION

Figure 1C:
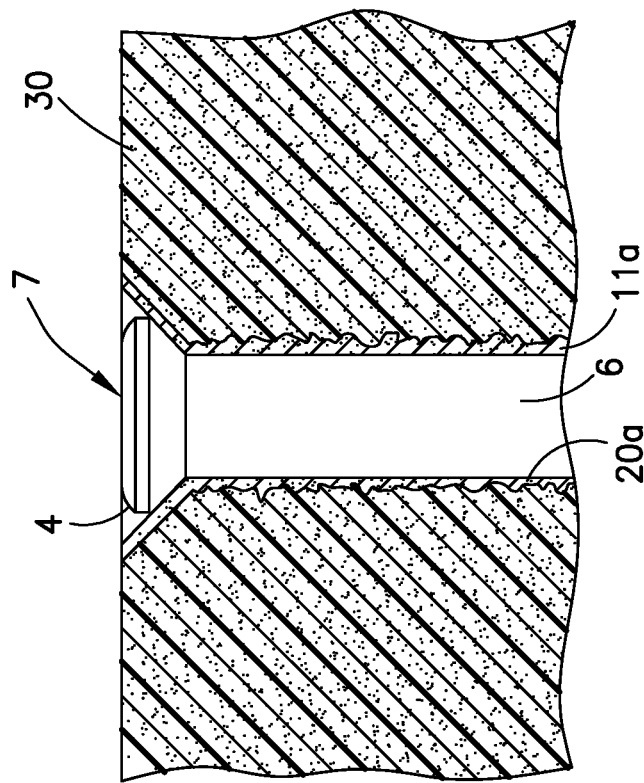

Various embodiments of apparatus and methods for injecting molten filler material into a hole in a composite layer will now be described in detail for the purpose of illustration. The apparatus and methods can be used to minimize interference fit variation and enhance electrical conductivity in an interference fit fastener assembly. At least some of the details disclosed below relate to optional features or aspects, which in some applications may be omitted without departing from the scope of the claims appended hereto.

In particular, one illustrative embodiment of a structural assembly comprising a first structural element made of metallic material (e.g., a metal alloy) attached to a second structural element made of composite material (e.g., fiber-reinforced plastic) by means of an interference fit fastener assembly is described in detail below. However, in alternative examples, the first and second structural elements can both be made of composite material. In addition, it should be appreciated that the concepts disclosed herein also have application in the attachment of three or more structural elements together.

In accordance with the aforementioned illustrative embodiment, the fastener comprises a pin and the mating part comprises a swaged collar that is interengaged with the external projections of the mating portion of the pin. However, the concepts disclosed herein also have application in other embodiments in which the fastener comprises a bolt and the mating part comprises a nut having internal threads that are interengaged with the external projections of the mating portion of the bolt.

The method proposed herein for fastening two or more layers of structural material together (at least one layer being made of composite material, e.g., carbon fiber-reinforced plastic) comprises the following steps performed independently for each composite layer: (a) drilling a hole in a composite layer; (b) heating filler material comprising an electrically conductive low-melting alloy to a molten state; (c) inserting a nozzle having an internal channel system into the hole with a gap separating the nozzle and the hole; (d) forcing molten filler material into, through and out of the internal channel system of the nozzle and into the gap; and (e) retracting the nozzle from the hole.

After all holes in all layers of composite material have been coated with filler material, those layers of composite material and any other layers made of a structural material other than composite material are placed in a stack such that the holes in the respective stacked layers are aligned. A respective fastener is pre-heated (to liquefy the surface of the solidified material to enable hydroplaning during insertion, thereby reducing resistance) and then inserted into a respective stack of aligned holes so that a shank of the fastener passes through the coated hole in the layer of composite material with an interference fit and a mating portion of the fastener extends beyond the outermost layer of structural material on the other side of the stack. A respective mating part that abuts that outermost layer is then coupled to the mating portion of the respective fastener. In each instance, the result is an interference fit fastener assembly in which at least a portion of the shank of the fastener is surrounded by electrically conductive material on the surface of the coated hole in the composite material.

The method described in the preceding paragraph may be used to coat holes in composite material that have a counterbore or a countersink in an uppermost portion of the hole. The method further comprises guiding flowing molten filler material to coat a surface of the counterbore or countersink. In accordance with alternative embodiments, the method can be used to coat holes in composite material that have neither a counterbore nor a countersink.

FIGS. 1A through 1D are diagrams representing respective sectional views of a composite layer 30 made of composite material having a countersunk hole 20 during four stages of one embodiment of the method described above. This embodiment involves concurrent incremental filling of the gap 15 along a depth of the gap during retraction of the nozzle 12.

FIGS. 1A and 1B show two instances in time subsequent to insertion of a nozzle 12 into a hole 20, which has been previously drilled in a composite layer 30 and subsequent to start of the filling process. During the filling process, a molten filler material 11 comprising an electrically conductive low-melting alloy is forced into and through an internal channel system 13 formed inside the body of the nozzle 12 and then out of a circular circumferential orifice 18 of the nozzle 12, exiting (i.e., being injected) into a gap 15 separating nozzle 12 and hole 20 during nozzle retraction. The direction of linear displacement of the nozzle 12 during molten filler material injection and nozzle retraction is indicated by the arrow located above the nozzle 12 in FIGS. 1A and 1B.

In accordance with the embodiment depicted in FIGS. 1A and 1B, the nozzle 12 includes a circular circumferential orifice 18 and a distal body portion 16 disposed below the circular circumferential orifice 18. The distal body portion 16 in this example has a contoured flow-redirecting surface (not numbered in FIGS. 1A and 1B, but see flow-redirecting surface 80b in FIG. 2C) that partly defines the circular circumferential orifice 18 and a circular cylindrical outer circumferential surface 84 having an outer diameter D. FIG. 1A shows the distal body portion 16 at a first elevation inside the hole 20 at a particular time, while FIG. 1B shows the distal body portion 16 at a second elevation at a later time, i.e., after the nozzle 12 has further retracted by the difference in respective depicted elevations. The distal body portion 16 displaces linearly upward in the hole 20 as molten filler material 11 exits the circular circumferential orifice 18. As the distal body portion 16 displaces upward, the flow-redirecting surface 80b redirects and pushes the molten filler material 11 toward the surface of the hole 20, causing the molten filler material 11 to fill any concavities in the hole surface. Concurrently, the circular cylindrical outer circumferential surface 84 shapes the molten filler material 11 in the gap 15 to form a coating 11a having an average thickness δ with a smooth circular cylindrical surface 31 having an internal diameter D, which is the same as the outer diameter of the circular cylindrical outer circumferential surface 84.

In the example depicted in FIGS. 1A and 1B, the hole 20 has a countersink (i.e., a chamfer 21) at the top of the hole 20. The chamfer 21 is also coated with the molten filler material 11 during the filling process. Coating the chamfer 21 is accomplished using a flexible end cap 22 having a conical portion 24 separated from the surface of the chamfer 21 by a conical gap 23, which conical gap 23 will be ultimately filled with molten filler material 11, as depicted in FIG. 1B. As seen in FIG. 1B, a volume of space under the end cap 22 and above the conical portion 24 is also filled with excess molten filler material 11. The excess filler material 11 is removed by a recycling pump 56 via a pipe 26 and returned to a molten filler material reservoir (not shown in FIGS. 1A and 1B, but see reservoir 54 shown in FIG. 3) via a pipe 28. When the distal body portion 16 reaches the conical portion 24 of the flexible end cap 22, retraction of the nozzle 12 is stopped, the remaining excess filler material 11 is removed, and the molten filler material 11 coating hole 20 is allowed to cool to form the coating 11a.

Figure 1D:
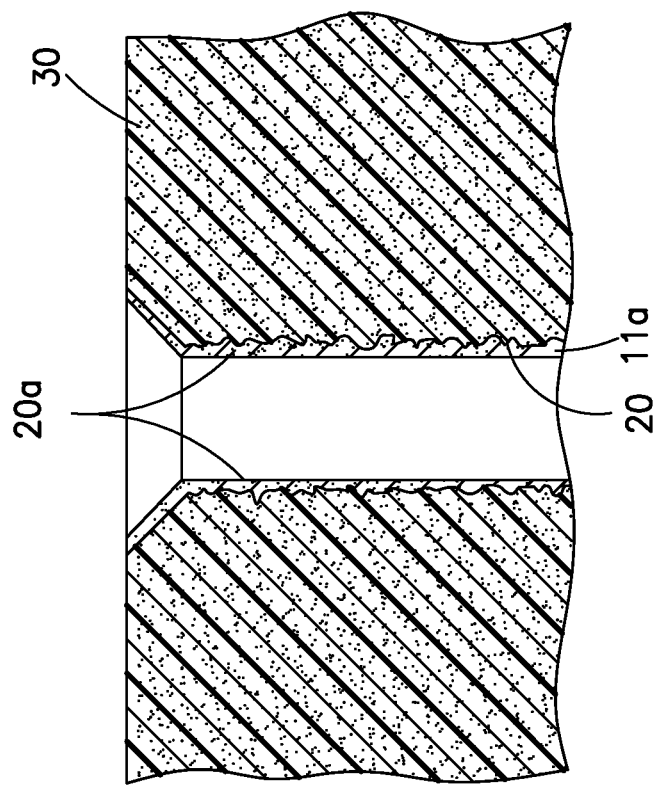
Figure 11:
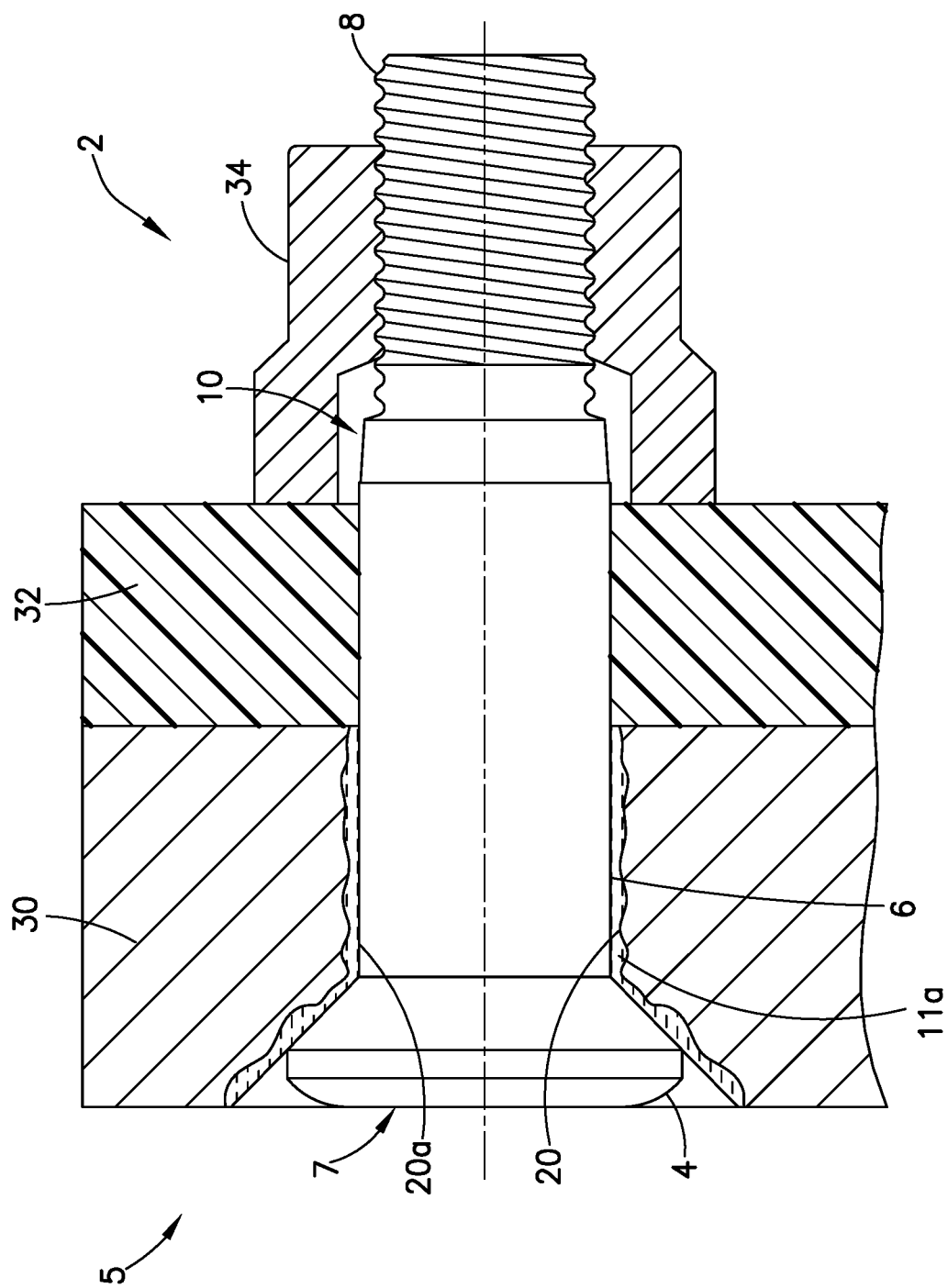
FIG. 11 is a diagram representing a partially sectioned view of an assembly comprising composite and metallic structures gripped by a sleeveless interference fit fastener assembly.

During the cooling (i.e., curing) process, the filler material 11 solidifies to form a coating 11a. The end result (partly depicted in FIG. 1C) is a coated hole 20a. As previously mentioned, the composite layer 30 is then placed in a stack with other layers of structural material (e.g., other layers of composite material that have undergone the same hole coating process) and a fastener 7 (shown in FIG. 1D) is installed in the hole. The fastener 7 can be heated prior to insertion to reduce friction during insertion. In the example depicted in FIG. 2D, fastener 7 has a head 4 and a shank 6. A threaded portion 8 of fastener 7 is shown in FIG. 11. As seen in FIGS. 1D and 11, the head 4 and shank 6 of the fastener 7 are in contact with the coating 11a.

Figure 2A:
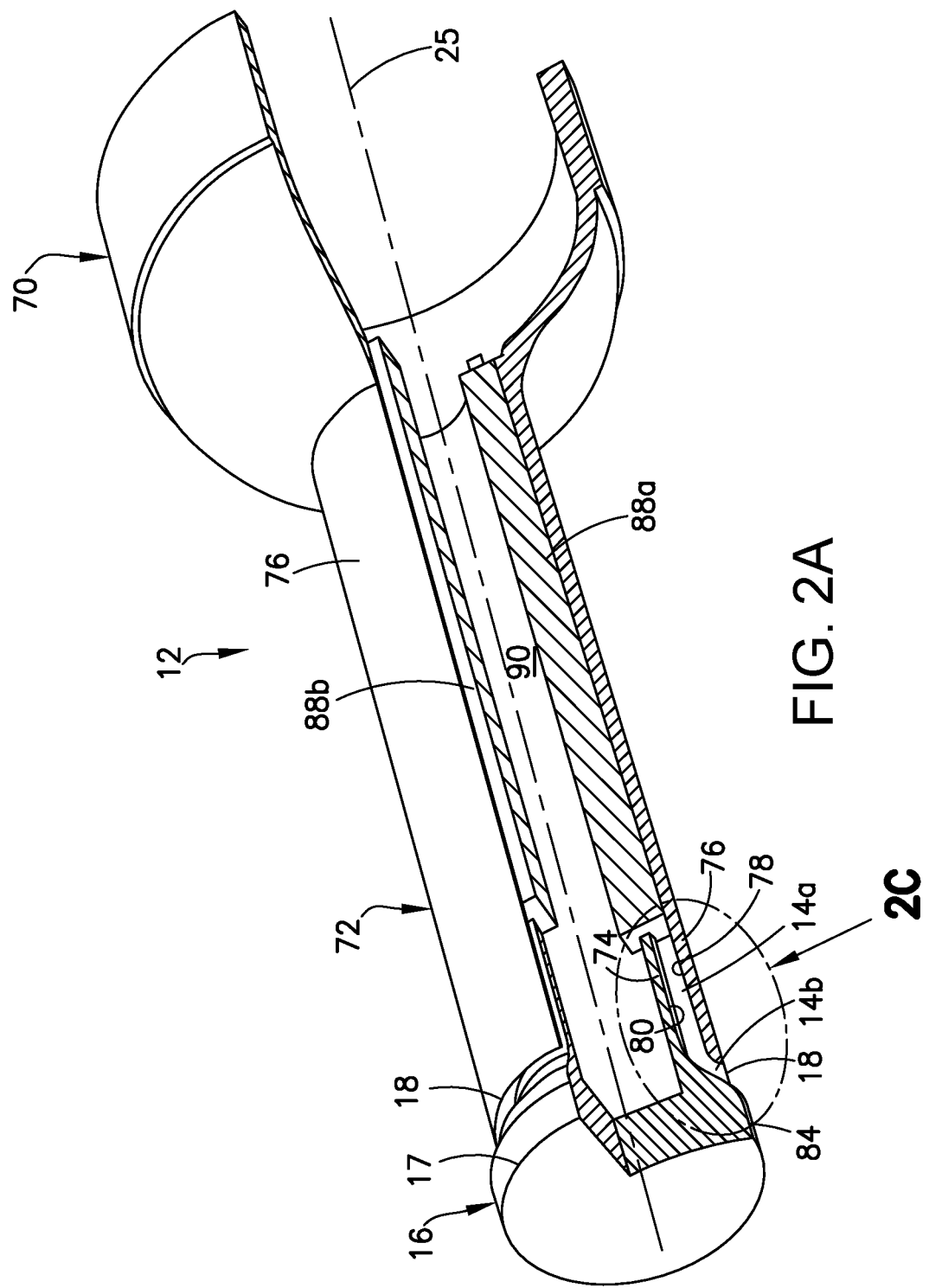
FIGS. 2A and 2B are diagrams representing respective longitudinally sectioned isometric views of one example of a nozzle for injecting electrically conductive molten filler material into a gap between the nozzle and surface(s) of a hole in the composite material in accordance with the method partly depicted in FIGS. 1A-1D.
Figure 2B:
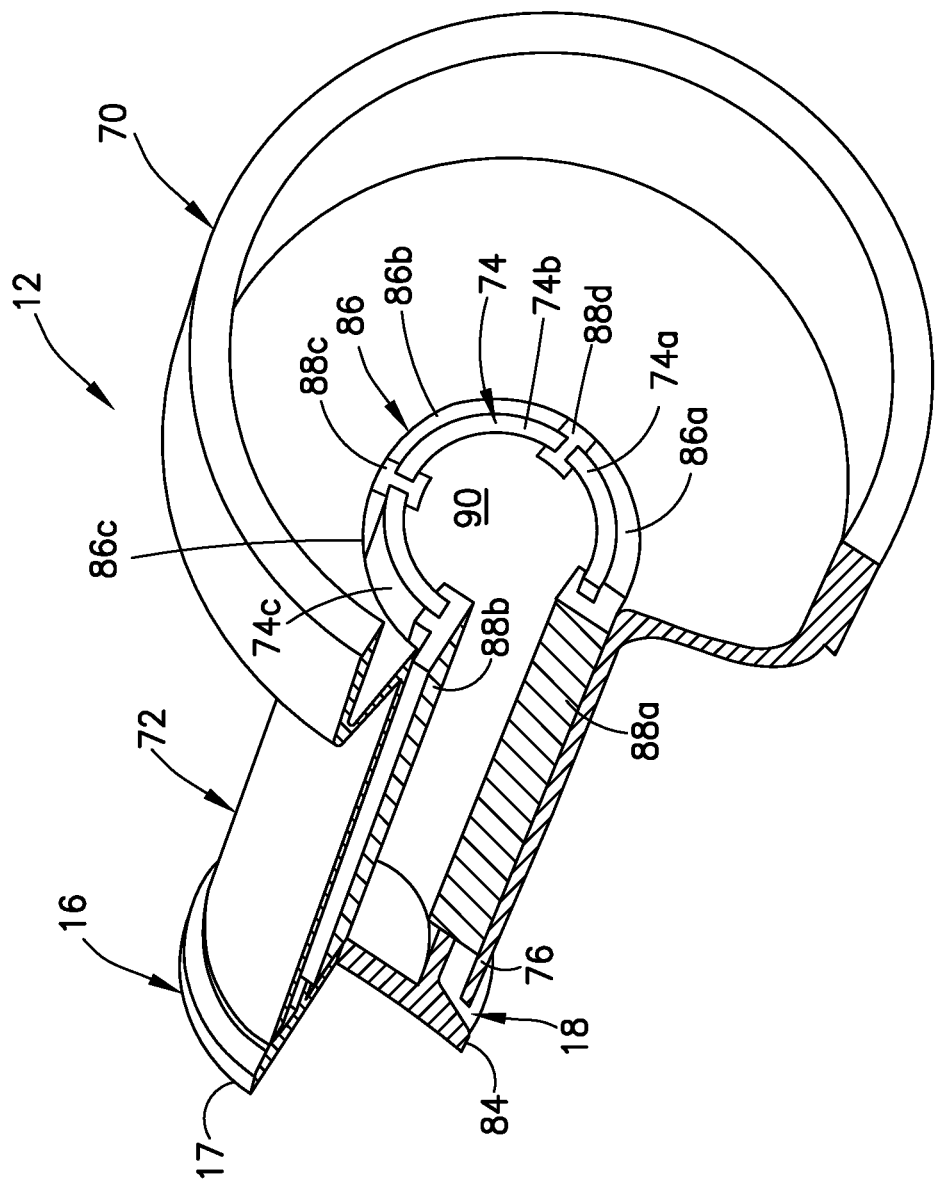
Figure 2C:
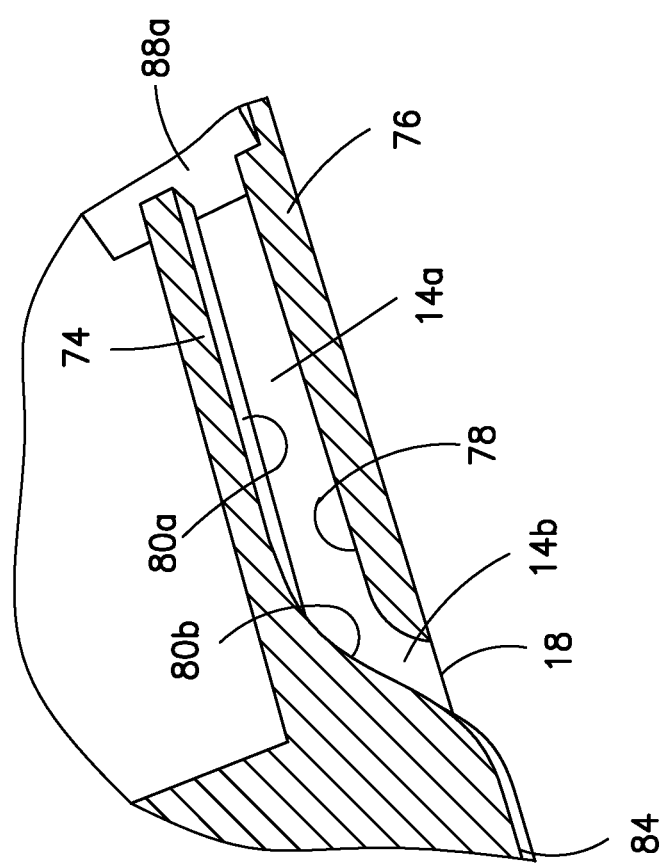
FIG. 2C is a diagram showing a portion of the nozzle depicted in FIG. 2A on a magnified scale, which portion is indicated by the ellipse 2C in FIG. 2A.

FIGS. 2A and 2B are diagrams representing respective longitudinally sectioned isometric views of one example of a nozzle 12 for injecting electrically conductive molten filler material 11 into a gap 15 defined between the nozzle 12 and a hole 20 in a composite layer 30. FIG. 2C is a diagram showing a portion of the nozzle depicted in FIG. 2A on a magnified scale, which portion is indicated by the ellipse 2C in FIG. 2A.

The nozzle 12 depicted in FIGS. 2A-2C includes a proximal body portion 70, an intermediate body portion 72, and a distal body portion 16. The proximal body portion 70 is cup-shaped and has an internal volume 71. The intermediate body portion 72 has a channel system 13. The channel system 13 includes a plurality of longitudinal melt channels 86, an annular longitudinal melt channel 14a, and a release melt channel 14b which may have a conical or continuously curved shape. The plurality of longitudinal melt channels 86 open at one end into the internal volume 71 of the proximal body portion 70 and open at the other end into the annular longitudinal melt channel 14a (best seen in FIG. 2C). In the embodiment shown in FIGS. 2A-2C, the number of longitudinal melt channels 86 equals four. Only three longitudinal melt channels 86a-86c of the four are shown in FIG. 2B, the fourth being located in the cutaway portion of the nozzle 12. The distal body portion 16 of the nozzle 12 has a contoured flow-redirecting surface 80b (which partly defines the release melt channel 14b) and a circular cylindrical outer circumferential surface 84.

The molten filler material 11 inside the longitudinal melt channels 86 can be heated during passage through the nozzle 12. The longitudinal melt channels 86 are configured to guide molten filler material 11 from the internal volume 71 of the proximal body portion 70 to flow through the nozzle 12 parallel to a longitudinal axis 25 of the nozzle 12. The molten filler material 11 then continues to flow through annular longitudinal melt channel 14a until the molten filler material 11 is redirected by flow-redirecting surface 80b.

As best seen in FIG. 2C, the flow-redirecting surface 80b is configured to divert longitudinally flowing molten filler material 11 exiting the annular longitudinal melt channel 14a to flow through the release melt channel 14b toward the circular circumferential orifice 18. A generally conical or continuously curved portion of the flow-redirecting surface 80b of the distal body portion 16 and an opposing circular terminal edge 77 of an outer circumferential wall 76 of the intermediate body portion 72 define the circular circumferential orifice 18. The flow-redirecting surface 80b extends further from the longitudinal axis 25 of the nozzle 12 than does the outer circumferential wall 76, i.e., flow-redirecting surface 80b has an outermost radius greater than the outer radius of the outer circumferential wall 76. More specifically, the flow-redirecting surface 80b of the distal body portion 16 of the nozzle 12 is a circumferential surface of revolution having a diameter that increases continuously to a maximum diameter of the distal body portion 16 (i.e., the outer diameter D of the circular cylindrical outer circumferential surface 84) that is greater than an outer diameter of the outer circumferential wall 76. The distal body portion 16 preferably has a sharp back edge 17 accompanied by a concave end surface 19 to skim the molten filler material 11 and prevent the molten filler material 11 from being pulled radially inward by adhesive forces as the nozzle 12 displaces upward during the filling/retraction process.

As best seen in FIGS. 2A and 2B, the intermediate body portion 72 of the nozzle 12 includes a circular cylindrical outer circumferential wall 76 having the circular terminal edge 77, which partly defines the circular circumferential orifice 18. The other side of the circular circumferential orifice 18 is defined by the flow-redirecting surface 80b of distal body portion 16. In the area of the nozzle 12 depicted in FIG. 2C, the intermediate body portion 72 of the nozzle 12 further includes a circular cylindrical inner circumferential wall 74 that is preferably concentrically disposed inside the outer circumferential wall 76. A surface 80a of the inner circumferential wall 74 and a surface 78 of the outer circumferential wall 76 are respective mutually concentric circular cylindrical surfaces that define the annular longitudinal melt channel 14a that receives molten filler material 11 from the longitudinal melt channels 86.

In accordance with the embodiment depicted in FIGS. 2A-2C, the inner circumferential wall 74 comprises at least three arc-shaped inner wall sections 74a-74c shown in FIG. 2B. In addition, the nozzle 12 further comprises radial spacers 88a-88d that maintain separation between inner circumferential wall 74 and outer circumferential wall 76. The longitudinal melt channels 86 (including longitudinal melt channels 86a-86c) are defined by respective portions of an inner surface of the outer circumferential wall 76, by respective portions of an outer surface of the inner circumferential wall 74, and by respective surfaces of respective pairs of radial spacers 88a-88d.

Figure 3:
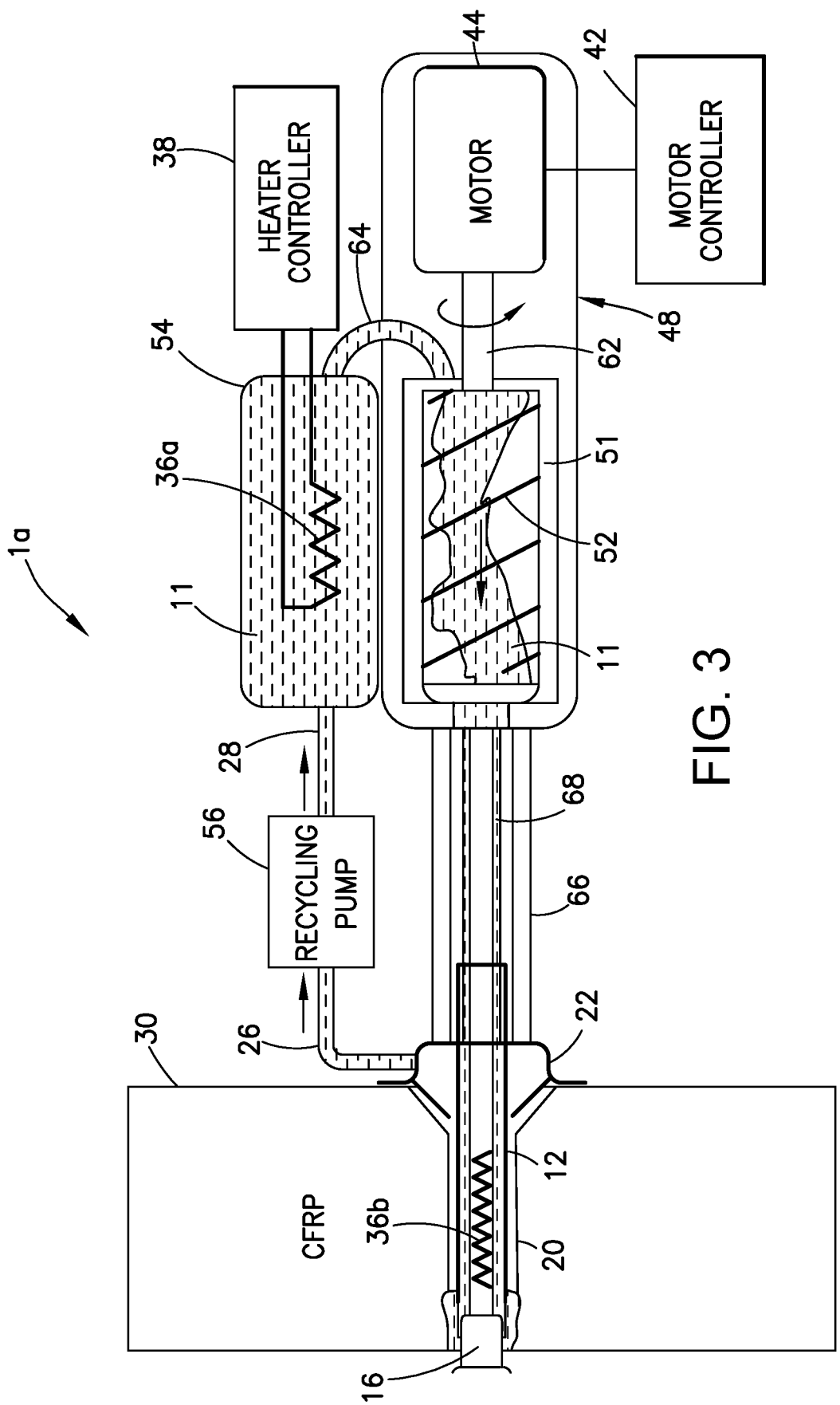
FIG. 3 is a hybrid diagram showing physical and operational relationships of some components of an apparatus for coating a surface of a countersunk hole in composite material with electrically conductive material using a linearly retracting and non-rotary nozzle of the type depicted in FIGS. 2A and 2B.

FIG. 3 is a hybrid diagram showing physical and operational relationships of some components of an apparatus 1a for coating a surface of a countersunk hole 20 in a composite layer 30 with electrically conductive filler material 11 using a linearly retracting and non-rotary nozzle 12 of the type depicted in FIGS. 2A-2C. In addition to the equipment which appears in FIG. 1A and which has already been described, the apparatus depicted in FIG. 3 comprises a reservoir 54 designed to hold molten filler material 11. Some of the molten filler material 11 in reservoir 54 may include recycled excess molten filler material 11 received from the recycling pump 56 via pipe 28. A reservoir heating element 36a, controlled by a heater controller 38, preferably maintains the temperature of the molten filler material 11 inside the reservoir 54 at less than 200° F. (93.3° C.).

The reservoir 54 is in fluid communication with an internal reservoir 51 of a pump assembly 48 via a pipe 64. The pump assembly 48 further includes a motor 44 having an output shaft 62 that is mechanically coupled to a screw 52 rotatably mounted inside the internal reservoir 51. When the motor 44 is activated by a motor controller 42, the motor 44 drives rotation of screw 52, which causes molten filler material 11 to be pumped from reservoir 54 to the nozzle 12 via a channel system 68 in a retraction guide 66 (see FIG. 9). The nozzle 12 is telescopically coupled to slide along the length of the retraction guide 66 during nozzle retraction. Any suitable actuator 65 and retraction mechanism 67 (see FIG. 9) may be provided for retracting the nozzle 12, such as a separate motor operatively coupled to a pinion, which pinion in turn has teeth that interengage the teeth of a rack that is connected to the nozzle. Alternatively, a pneumatic or hydraulic cylinder actuated by an electrically controllable valve or a motor-driven worm gear or various motor-driven gear trains could be used to retract the nozzle 12 during the gap filling process.

The apparatus 1a depicted in FIG. 3 further comprises a heating element 36b disposed inside the nozzle 12. The heating element 36b is also controlled by the heater controller 38. The heater controller 38 is preferably configured to control the heating elements 36a and 36b based on temperature measurement data received from a temperature sensor (not shown in FIG. 3, but see temperature sensor 40 shown in FIG. 9) placed inside the reservoir 54. Additional temperature sensors may be placed at strategic locations, e.g., inside the nozzle 12. For example, pyrometers can be employed as a temperature sensor 40.

Figure 4:
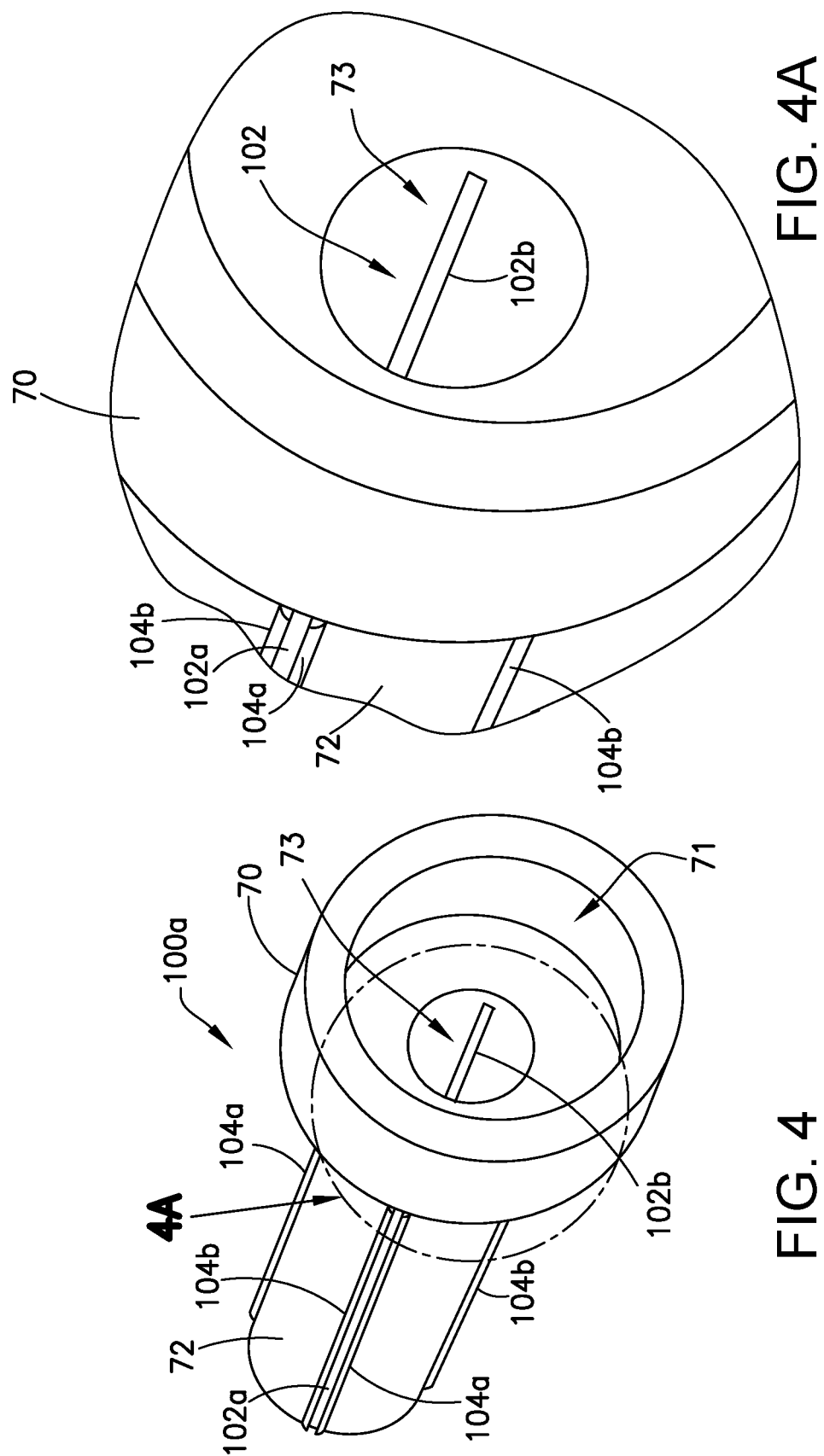
FIG. 4 is a diagram representing one view of a nozzle having a plurality of circumferentially distributed longitudinal linear openings in accordance with one embodiment.
Figure 5:
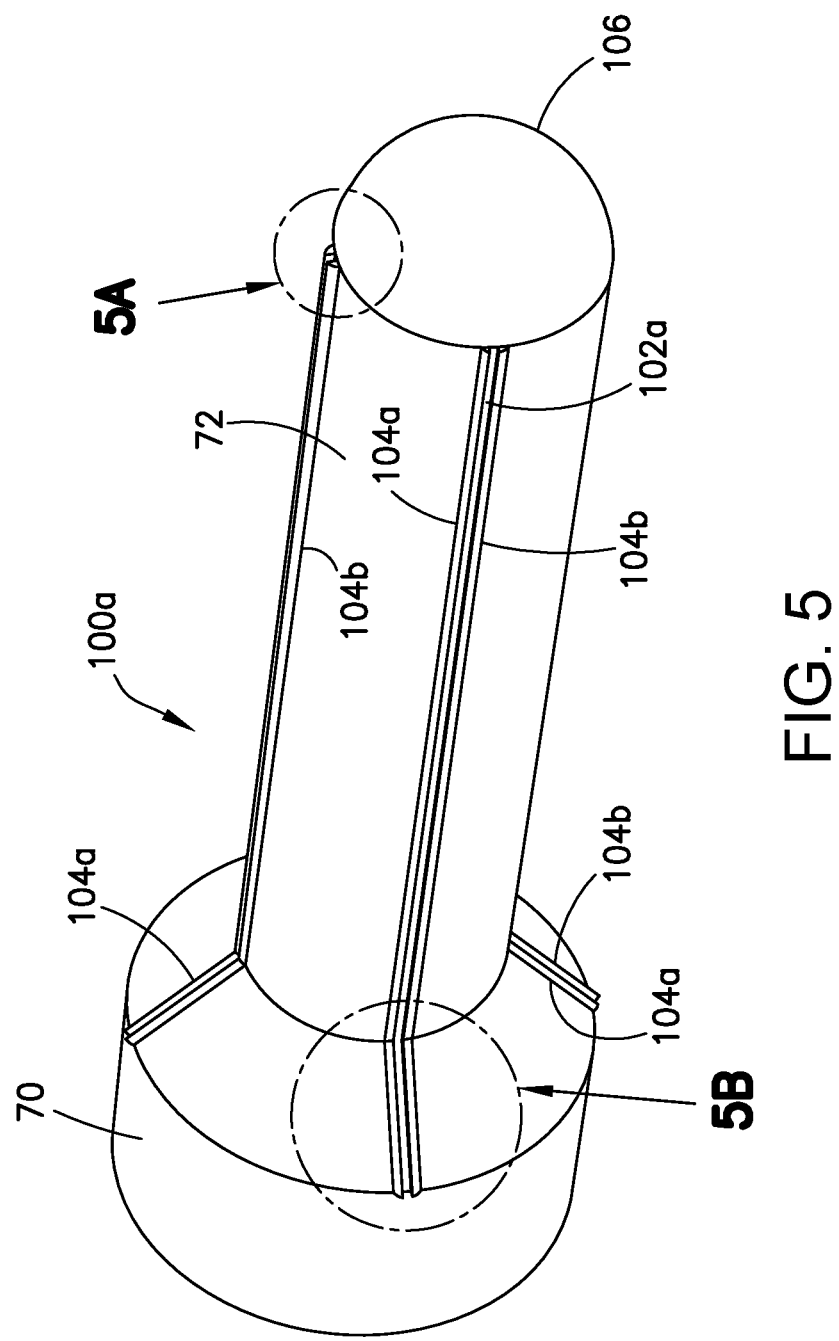
FIG. 5 is a diagram representing another view of the nozzle depicted in FIG. 4.

In accordance with alternative embodiments, a rotary nozzle may be used to apply a coating of molten filler material 11 on the surface of a hole 20 in a composite layer 30. FIG. 4 is a diagram representing one view of a rotary nozzle 100a with four circumferentially distributed and longitudinally extending linear side openings 102 in accordance with one embodiment. Only linear side openings 102a and 102b are visible in FIG. 4. FIG. 4A is a diagram showing a portion of the rotary nozzle 100a depicted in FIG. 4 on a magnified scale, which portion is indicated by the circle 4A in FIG. 4. FIG. 5 is a diagram representing another view of rotary nozzle 100a. FIG. 5A is a diagram showing one portion of rotary nozzle 100a on a magnified scale, which portion is indicated by the circle 5A in FIG. 5. FIG. 5B is a diagram showing another portion of rotary nozzle 100a on a magnified scale, which portion is indicated by the circle 5B in FIG. 5.

The rotary nozzle 100a depicted in FIGS. 4 and 5 includes a proximal body portion 70 having a cup shape and an internal volume 71, a circular cylindrical intermediate body portion 72 having an internal channel 73 and the aforementioned plurality of linear side openings 102 (including linear side openings 102a and 102b and two other side openings not shown), and a rounded convex distal body portion 106. The linear side openings 102 extend the length of the intermediate body portion 72 and allow molten filler material 11 to exit the internal channel 73. The linear side openings 102 also extend into the proximal body portion 70. As best seen in FIGS. 5A and 5B, the nozzle 100a further includes respective pairs of beveled projections 104a and 104b disposed at opposite edges of each side opening 102. The beveled projections 104a and 104b project outward. As best seen in FIG. 5A, each beveled projection 104a and 104b has a cross-sectional shape that resembles a quadrant of a circle. The rounded surface of each beveled projection 104a and 104b is the surface that deflects molten filler material 11 in its path radially outward as the rotary nozzle 100a rotates.

During rotation, the rotary nozzle 100a receives pressurized molten filler material 11 and injects molten filler material 11 into the gap 15 separating hole 20 and nozzle 100a until the gap 15 is filled with molten filler material 11. Concurrently, the leading beveled projections 104a or 104b (depending on the direction of rotation) push the injected molten filler material 11 in a direction that has a radially outward component, thereby generating forces that cause the molten filler material 11 to flow into and fill any concavities (e.g., crevices or voids) in the surface of hole 20, in addition to adhering to the surface of hole 20 with an average thickness δ. The radius at the tips of the beveled projections 104 establishes the inner diameter D of the resulting coated hole 20a.

Figure 6A:
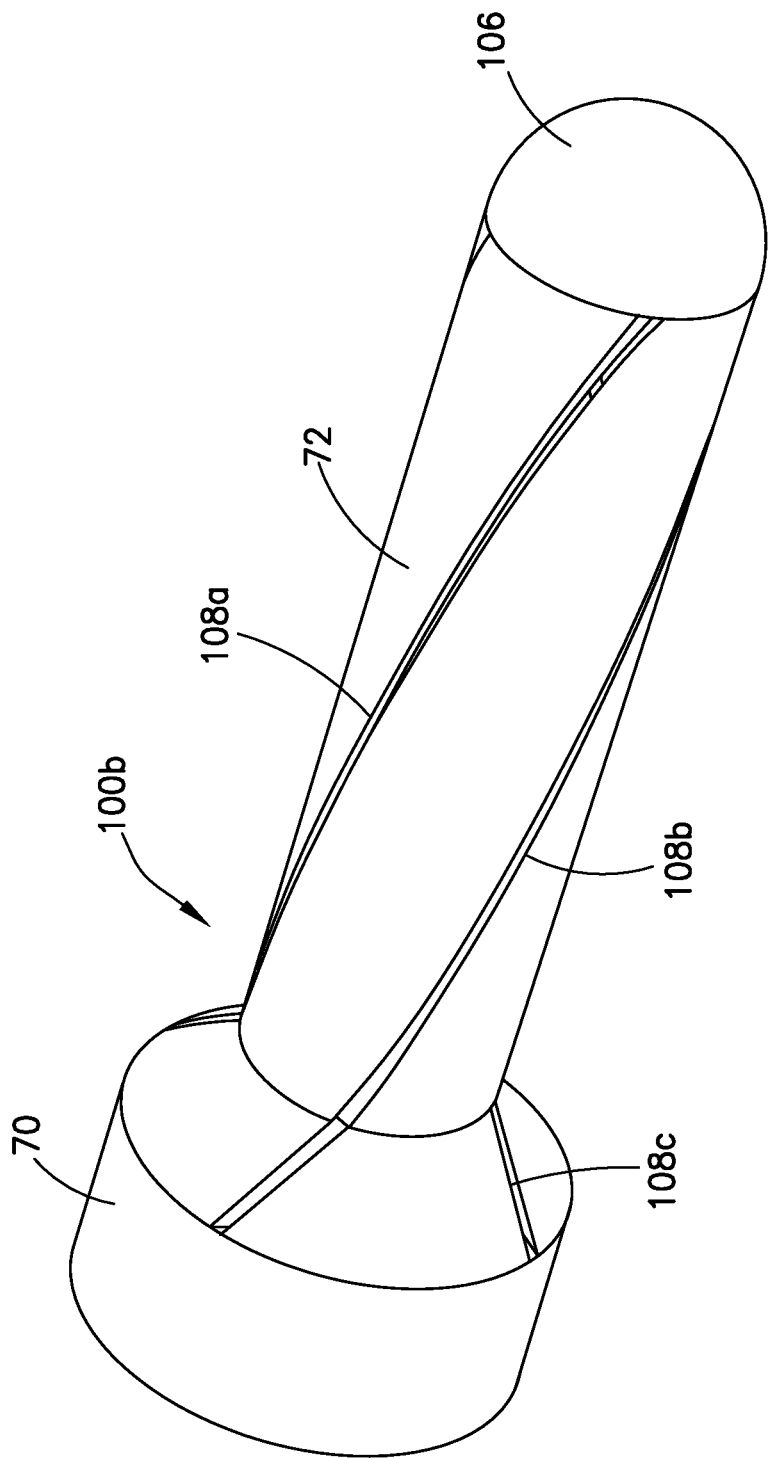
FIGS. 6A and 6B are diagram representing respective views of a rotary nozzle having a plurality of circumferentially distributed helical openings in accordance with another embodiment.
Figure 6B:
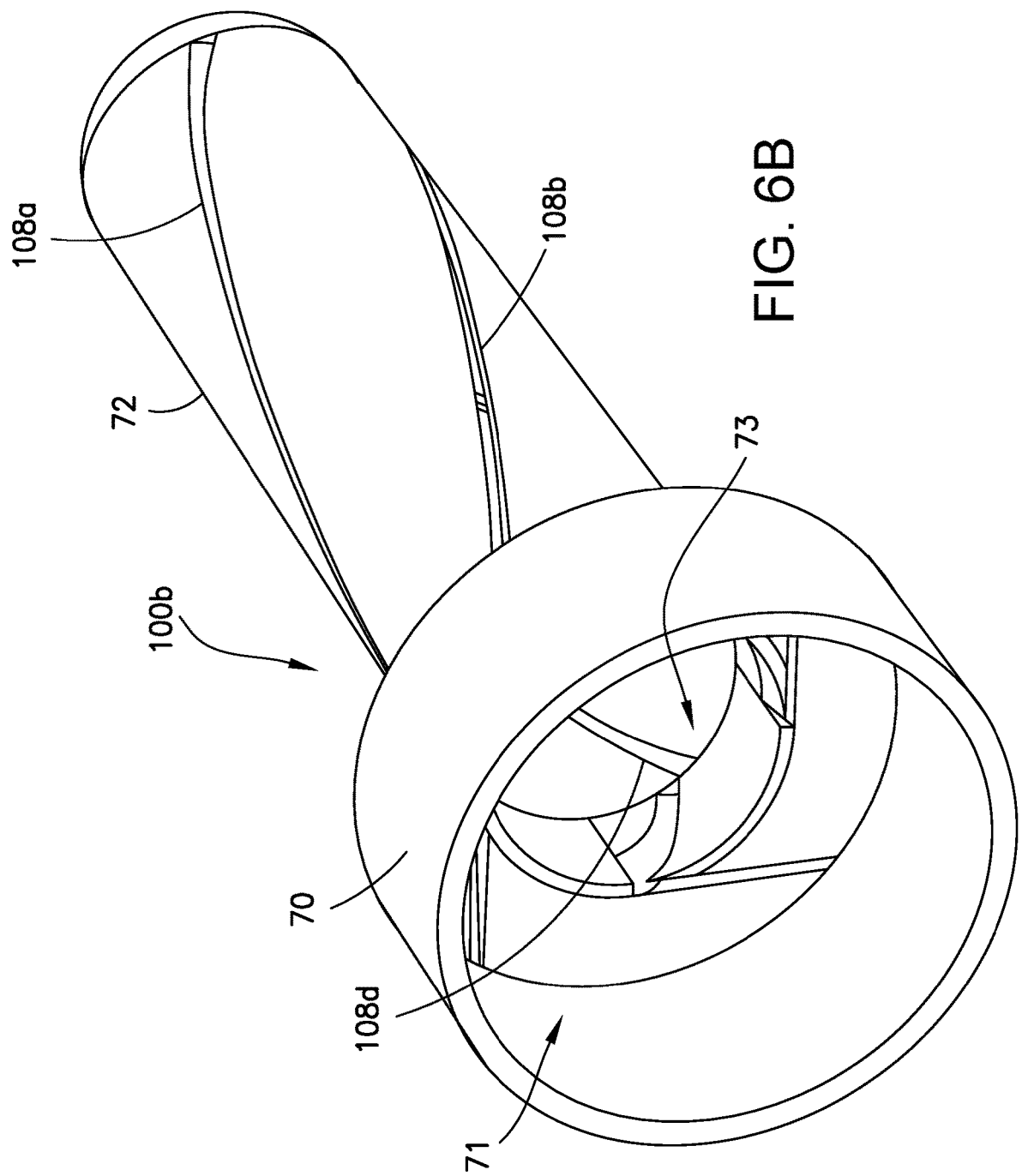

FIGS. 6A and 6B are diagrams representing respective views of a rotary nozzle 100b having four circumferentially distributed helical side openings 108a-d in accordance with another embodiment. The rotary nozzle 100b includes a proximal body portion 70 having a cup shape and an internal volume 71, a circular cylindrical intermediate body portion 72 having an internal channel 73 and a plurality of helical side openings 108a-d, and a rounded convex distal body portion 106. The helical side openings 108a-d extend along the length of the intermediate body portion 72 and allow molten filler material 11 to exit the internal channel 73. The helical side openings 108a-d also extend into the proximal body portion 70. During rotation, the rotary nozzle 100b injects molten filler material 11 until the gap 15 separating hole 20 and rotary nozzle 100b is filled. The outer diameter of the circular cylindrical intermediate body portion 72 is the same as and establishes the inner diameter D of the resulting coated hole 20a.

Figure 7:
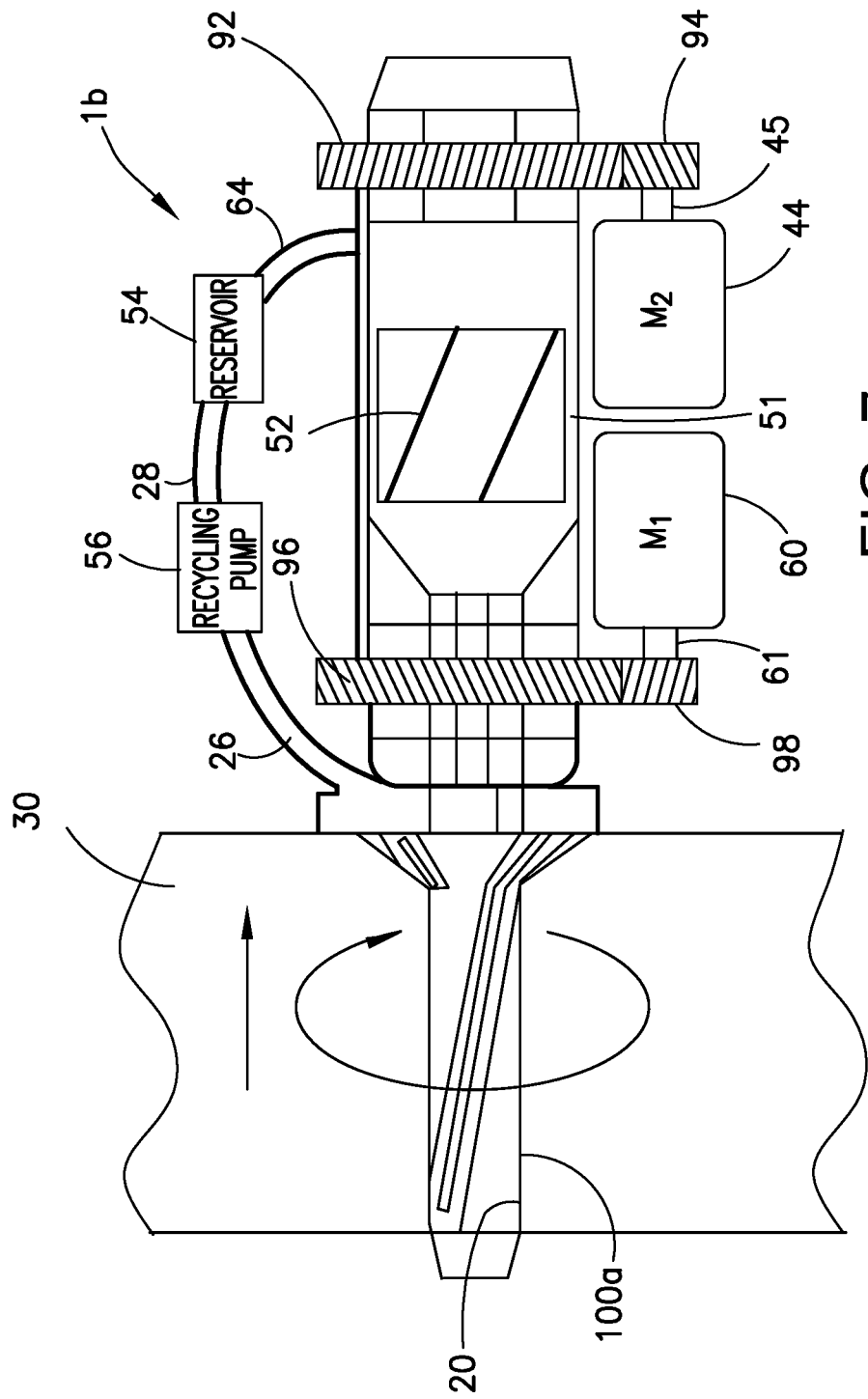
FIG. 7 is a hybrid diagram showing physical and operational relationships of some components of an apparatus for coating a surface of a countersunk hole in composite material with electrically conductive material using a rotary nozzle.

FIG. 7 is a hybrid diagram showing physical and operational relationships of some components of an apparatus 1b for coating a countersunk hole 20 in a composite layer 30 with electrically conductive molten filler material 11 using rotary nozzle 100a (see FIGS. 4 and 5). In the alternative, rotary nozzle 100b (see FIG. 6) could be substituted for rotary nozzle 100a.

The apparatus 1b depicted in FIG. 7 comprises a reservoir 54, a recycling pump 56, and connecting pipes 26, 28 and 64 as previously described. Molten filler material 11 is provided from reservoir 54 to an internal reservoir 51. A screw 52 inside the internal reservoir 51 is driven to rotate by a motor 44 that is operatively coupled to the screw 52 by means of a first gear train comprising a first gear 94 mounted to the output shaft 45 of motor 44 and a second gear 92 mechanically coupled to the shaft (not shown) of the screw 52. During rotation of screw 52, the screw 52 forces molten filler material 11 into the rotary nozzle 100a for injection into hole 20. The rotary nozzle 100a is driven to rotate by a motor 60 that is operatively coupled to the rotary nozzle 100a by means of a second gear train comprising a third gear 98 mounted to the output shaft 61 of motor 60 and a fourth gear 96 mechanically coupled to the rotary nozzle 100a.

Figure 8:
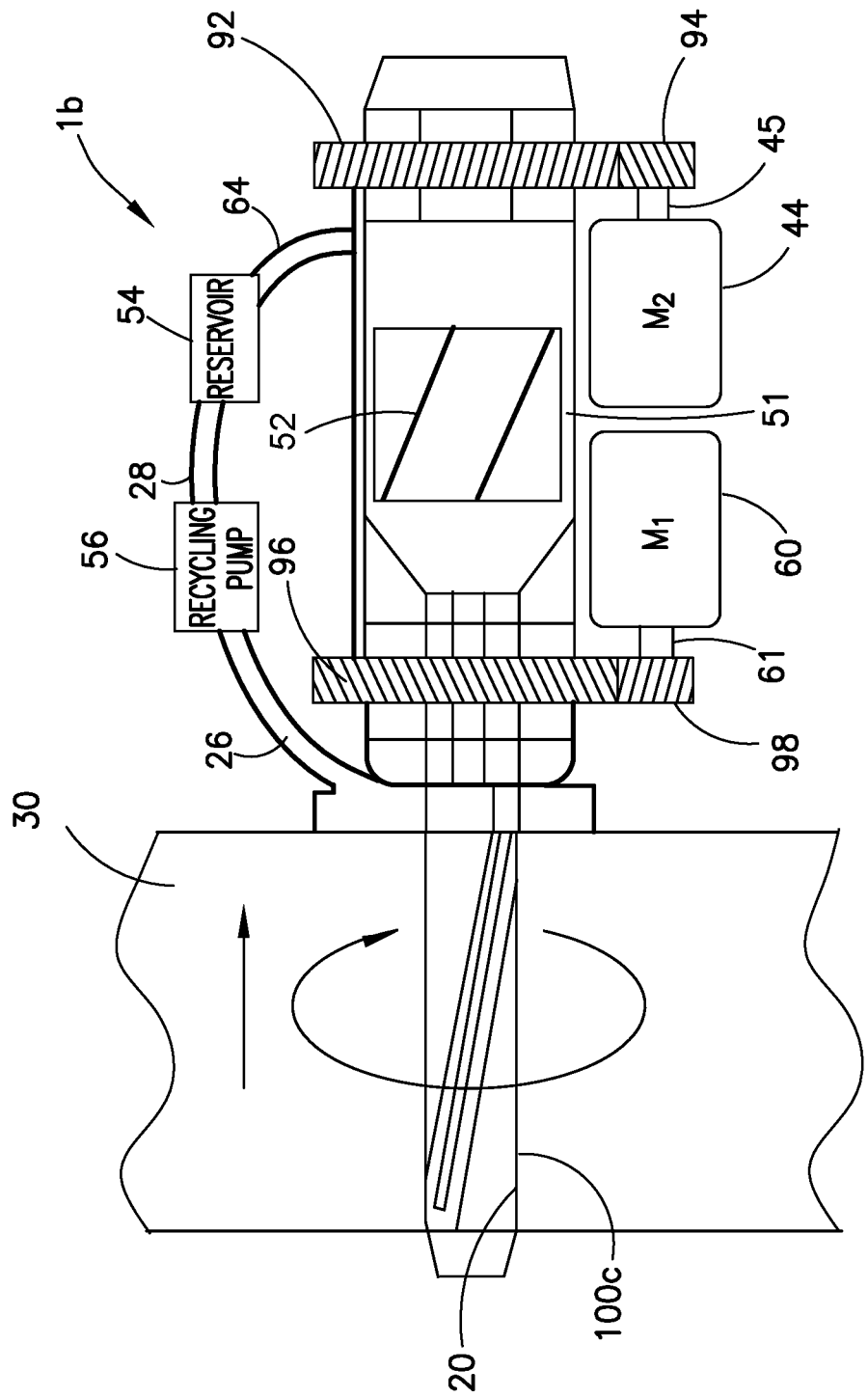
FIG. 8 is a hybrid diagram showing physical and operational relationships of some components of an apparatus for coating a surface of a flush hole in composite material with electrically conductive material using a rotary nozzle.

FIG. 8 is a hybrid diagram showing physical and operational relationships of some components of an apparatus 1b for coating a hole 20 in a composite layer 30 with electrically conductive molten filler material 11 using a rotary nozzle 100c. In this embodiment, the hole 20 has neither a countersink nor a counterbore such that the chamfer 21 is omitted. Therefore the rotary nozzle 100c is suitably configured to inject molten filler material 11 into hole 20. The other components depicted in FIG. 8 are the same as those depicted in FIG. 7.

Figure 9:
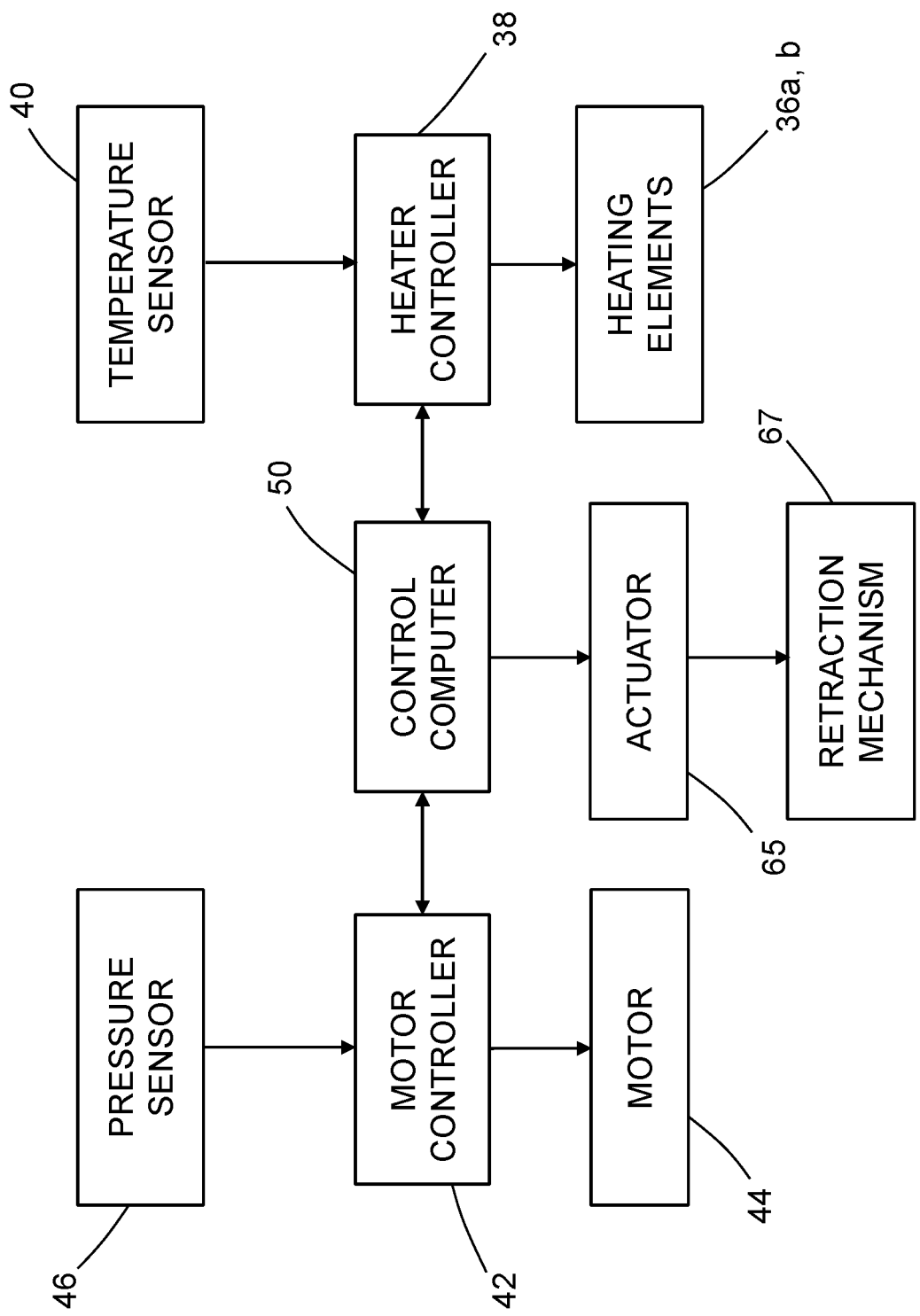
FIG. 9 is a block diagram identifying some additional components of the apparatus partly depicted in FIG. 3.

FIG. 9 is a block diagram identifying some additional components of the apparatus 1a partly depicted in FIG. 3. The apparatus 1a includes a control computer 50 that executes instructions stored in a non-transitory tangible computer-readable storage medium that may be incorporated in or external to the control computer 50. The control computer 50 is operatively coupled to the motor controller 42 and the heater controller 38 by two-way communication links.

The motor controller 42 includes a separate computer or processor that is programmed to receive pressure measurement data from a pressure sensor 46 and control the motor 44 as a function of pressure data obtained by the pressure sensor 46. The pressure sensor 46 may be located inside any component that holds molten filler material 11 since the latter is an incompressible fluid having the same pressure everywhere in the flow circuit. The apparatus 1a is scalable and the flow rate at the circular circumferential orifice 18 (see FIG. 1) depends on the required release rate, orifice cross-sectional area, and/or the static pressure of the molten filler material 11. The apparatus 1a must maintain a relatively constant pressure during release. For instance, if the nozzle 12 is moving up and suddenly there is relatively large gouge in the hole surface, the sudden additional volume of the gap 15 separating nozzle 12 and hole 20 takes a relatively large amount of molten filler material 11, thereby causing the pressure to drop for a fraction of a second. The feedback loop among the control computer 50, the motor controller 42, and the heater controller 38 is configured to compensate to maintain the pressure by increasing the flow of molten filler material 11.

Still referring to FIG. 9, the heater controller 38 also comprises a separate computer or processor that is programmed to receive temperature measurement data from a temperature sensor 40 and control the heating elements 36a and 36b as a function of the temperature measurement data. More than one temperature sensor 40 may be placed at strategic locations, including inside the nozzle 12.

In accordance with the embodiment depicted in FIG. 9, the control computer 50 can be configured to coordinate the operations of the heater controller 38 and motor controller 42. In accordance with an alternative embodiment, the measurement data acquired by the temperature sensor 40 and pressure sensor 46 may be received by the control computer 50, in which case the heater controller 38 and motor controller 42 can be controlled by the control computer 50. For example, the control computer 50 reads the pressure and temperature measurement data and outputs heater power control signals that control the power supplied to the heating elements 36a and 36b in a closed-loop control system. The heater power control signals are sent by the control computer 50 to a signal conditioner (not shown), which in turn outputs conditioned heater power control signals to the heater controller 38. The heater controller 38 is configured to convert conditioned heater power control signals to an output voltage which is used to power the heating elements 36a and 36b.

In addition, the control computer 50 may be configured with programming for controlling the retraction motion of the retractable nozzle 12. As previously mentioned, the actuator 65 may comprise a motor, while the retraction mechanism 67 may comprise any one of a plurality of different types of motor-driven gear trains. Alternatively, the actuator 65 may comprise an electrically controllable valve, while the retraction mechanism 67 may comprise a pneumatic or hydraulic cylinder. In each case, the actuator 65 and retraction mechanism 67 are responsive to control signals received from the control computer 50.

In accordance with one proposed implementation, the control computer 50 is configured with programming for controlling a rate of rotation of the screw 52 of the pump assembly 48 and a rate of displacement of the retraction mechanism 67 during a filling operation. In accordance with an alternative proposed implementation, the control computer 50 is configured with programming for controlling a rate of rotation of the screw 52 and a rate of rotation of the rotary nozzle 100a during a filling operation.

There are generally two options for the insertion/retraction of both non-rotary and rotary nozzles. The apparatuses 1a and 1b depicted in FIG. 3, 7, or 8 can be attached to the end effector of a robot arm (not shown in the drawings), in which case the robot arm can move the apparatus 1a or 1b toward and away from a workpiece. A telescopic mechanism can be used to insert or retract the nozzle 12. In accordance with one proposed methodology that employs a rotary nozzle 100a, 100b, or 100c, first the nozzle 12 is centered in the hole 20. Then the rotary nozzle 100a, 100b, or 100c is rotated to inject molten filler material 11 into the hole 20. Once the nozzle rotation (or multiple rotations) is complete, the nozzle 12 is retracted.

In many aircraft applications, the composite material comprises carbon fiber-reinforced plastic (CFRP). The structural integrity of CFRP material may be compromised at a temperature over 254° F. (123.3° C.). Accordingly, it is preferred that the electrically conductive filler material comprise low-melting alloy that melts at a temperature well below 254° F. (123.3° C.), for example, below 200° F. (93.3° C.), is used as the molten filler material 11. FIG. 10 is Table 1 listing sample compositions of filler materials which meet the foregoing criterion and are suitable for use as the molten filler material 11 in the methods disclosed in some detail hereinabove. These gap filler materials include or are gallium-based alloys of liquid metal combined with a pure solid metal or with a solid metal alloy.

As can be seen in Table 1, gallium alloys are formed by combining gallium with one or both of tin and indium. These metal alloys are initially in a liquid state at about room temperature below 30° C. The liquid metal alloy containing gallium is then mixed with a solid metal or solid metal alloy in either a powder or film state. The particle size or film thickness may be between 50 nanometers and 100 microns. As can be seen in Table 1, the solid metal mixed with gallium alloy is selected from the group consisting of pure nickel, pure copper, or pure silver. Bronze can be selectively used to mix with the liquid gallium metal alloy. Table 1 shows the material elemental weight ratios of the chemical components to be mixed to create each sample filler material.

With the mixing of gallium alloy with solid metal or solid metal alloy, the resulting slurry or paste-like consistency enables proper application of the molten filler material 11 to conform to the roughened surface of the hole 20 in the composite layer 30. After the nozzle 12 is removed from the hole, the molten filler material 11 cures to a solid state coating 11a.

An additional mechanical reinforcing phase can be added to the slurry of the mixture of the liquid gallium metal alloy with a solid metal or solid metal alloy. This mechanical phase will provide enhanced shear resistance to the cured solidified alloy. This mechanical phase material can selectively include one of the following: pure cobalt, pure tungsten, pure molybdenum, pure titanium, a titanium alloy (such as AMS 4911), or a stainless steel (such as 302 or 316).

Since the distal body portion 16 of the nozzle 12 can be center-less ground to a specific diameter, the effective hole size will be controlled by the diameter of the distal body portion 16 rather than the drilling process. This change can reduce the variability of diameters of holes 20 and allow for less variation in the interference levels between the fastener 7 and the hole 20 (reducing process variation and allowing for increased cutter life). By compressing the conductive molten filler material 11 into the voids in the surface(s) of the hole 20, the electrical conductivity, the fatigue life, and/or fluid-tight properties can be improved as compared to conventional hole formation and preparation.

In addition, the coating 11a of solidified filler material can compensate for anomalies in the surface(s) of the hole 20 that may result during the hole drilling process due to the thickness of the coating 11a. For example, the coating 11a of solidified filler material can compensate for a 1° offset of an axis of the hole 20. The gap filling process disclosed above can be employed with many different types of interference fit fastener assemblies. For the sale of illustration, once such interference fit fastener assembly will now be described.

As seen in the partially sectioned view shown in FIG. 11, the result of the hole drilling and hole coating processes disclosed above is a structural assembly 5 that can be incorporated in an aircraft. The structural assembly 5 includes a composite layer 30 having a hole 20 with a relatively rough surface that has crevices. The structural assembly 5 also includes a coating 11a adhered to the hole 20 while filling the crevices. The coating 11a defines a circular cylindrical coated hole 20a having a relatively smooth surface. The composite layer 30 has fibers made of electrically conductive material and the coating 11a includes or is an electrically conductive low-melting alloy, such as those described with respect to FIG. 10. As seen in FIG. 11, this structural assembly 5 may further include a layer 32 of structural material disposed adjacent to and in contact with the composite layer 30.

The structural assembly 5 also includes a sleeveless interference fit fastener assembly 2 having a fastener 7 and a swaged collar 34. The fastener 7 includes a shank 6, a threaded portion 8, and a transition portion 10. In alternative embodiments, the fastener 7 may have external annular rings instead of external threads. Although FIG. 11 depicts a fastener 7 having a countersunk (i.e., flush) head 4, fastener 7 may in the alternative have a protruding head. An interference fit is achieved by providing a coated hole 20a having an inner diameter D that is less than the outer diameter of the shank 6 (e.g., a difference of a few thousandths of an inch).

The fastener 7 shown in FIG. 11 is inserted into the coated hole 20a from one side of the joint structure and the unswaged collar (not shown in FIG. 11) is placed over the fastener 7 from the other side of the joint structure. Access to both sides of the joint structure is required. During the installation cycle of the fastener 7, the unswaged collar (in the form of a loose-fitting metal ring) is deformed around the fastener 7, which has locking grooves on the threaded portion 8. The fastener 7 and swaged collar 34 combine to form the fastener assembly 2.

The bolts and pins disclosed herein are preferably made of a metal alloy such as titanium alloy, aluminum alloy, Inconel or corrosion-resistant steel. The collars disclosed herein are preferably made of titanium alloy, aluminum alloy or corrosion-resistant steel.

Figure 12:
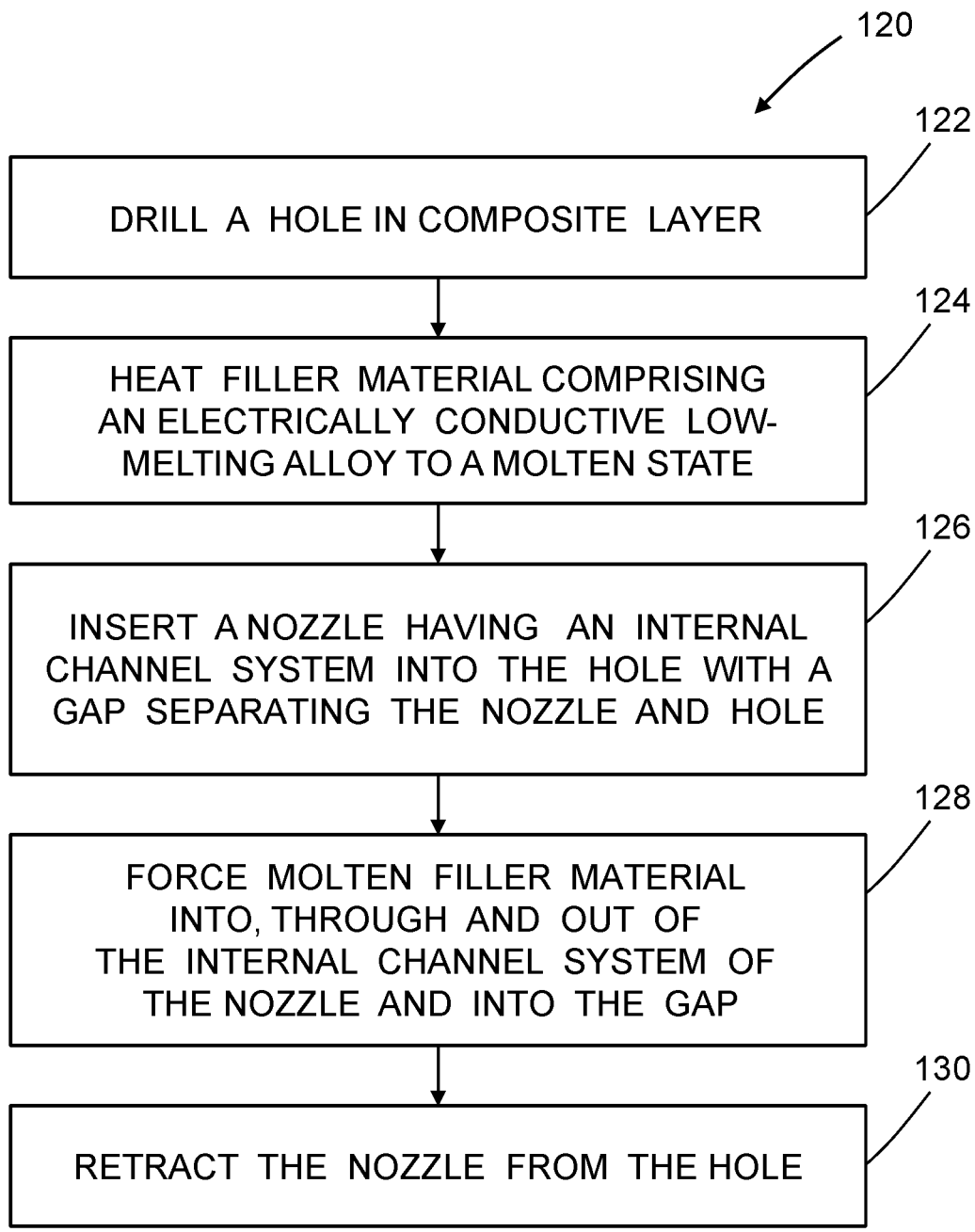
FIG. 12 is a flowchart identifying steps of a method for injecting molten filler material into a hole in accordance with one embodiment.

FIG. 12 is a flowchart identifying steps of a method 120 for injecting molten filler material 11 into a hole 20 in accordance with one embodiment. The method 120 comprises: (a) drilling a hole 20 in a composite layer 30 (step 122); (b) heating filler material comprising an electrically conductive low-melting alloy to a molten state to produce molten filler material 11 (step 124); (c) inserting a nozzle 12 having an internal channel system 13 into the hole 20 with a gap 15 separating the nozzle 12 and the hole 20 (step 126); (d) forcing the molten filler material 11 into, through, and out of the internal channel system 13 of the nozzle 12 and into the gap 15 (step 128); and (e) retracting the nozzle 12 from the hole 20 (step 130). The molten filler material 11 cools to form a coating 11a on the surface(s) of the hole 20. A fastener 7 is inserted into the coated hole 20a, as described above, to couple layers 30, 32 of material together using the interference fit fastener assembly 2.

While apparatus and methods for injecting molten filler material into a hole in a composite layer have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

In the event that the annexed claims are amended during prosecution to include the term "computer system", that term should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit). For example, in an embodiment where the heater controller 38, motor controller 42 and control computer 50 each comprise at least one processor, all of those processors may be deemed to be components of a "computer system" if, for example, the control computer communicates with both the heater controller 38 and the motor controller 42.

The method claims appended hereto should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for injecting molten filler material into a hole, the method comprising:
   (a) drilling the hole in a composite layer;
   (b) heating filler material comprising an electrically conductive low-melting alloy to a molten state to produce the molten filler material;
   (c) inserting a nozzle having an internal channel system into the hole with a gap separating the nozzle and the hole;
   (d) forcing the molten filler material into, through, and out of the internal channel system of the nozzle and into the gap; and
   (e) retracting the nozzle from the hole.

2. The method as recited in claim 1, further comprising rotating the nozzle as the molten filler material exits the nozzle.

3. The method as recited in claim 2, wherein the molten filler material exits the nozzle through a plurality of circumferentially distributed side openings.

4. The method as recited in claim 1, wherein the molten filler material exits the nozzle during retraction of the nozzle.

5. The method as recited in claim 4, wherein the molten filler material exits the nozzle through a circular circumferential orifice and is redirected and pushed in a direction having a radially outward component by a contoured flow-redirecting surface of the nozzle during retraction of the nozzle.

6. The method as recited in claim 1, further comprising guiding excess molten filler material to flow from the gap to a reservoir external to the hole.

7. The method as recited in claim 1, wherein step (a) comprises drilling a hole that has a chamfer in an uppermost portion of the hole, the method further comprising guiding a flow of the molten filler material to coat a surface of the chamfer.

8. The method as recited in claim 1, further comprising heating the molten filler material as the molten filler material flows through the internal channel system of the nozzle.

9. The method as recited in claim 1, wherein the nozzle is retracted until the nozzle is completely removed from the hole, the method further comprising inserting a fastener into the hole with an interference fit.

10. The method as recited in claim 9, further comprising heating the fastener before insertion.

11. An apparatus for injecting molten filler material into a hole, the apparatus comprising:
a reservoir for storing the molten filler material that is electrically conductive;
a pump assembly in fluid communication with the reservoir; and
a nozzle in fluid communication with the pump assembly for receiving the molten filler material pumped from the reservoir and ejecting the molten filler material, wherein the nozzle comprises:
a proximal body portion having an internal volume in fluid communication with the pump assembly;
an intermediate body portion comprising a plurality of longitudinal melt channels configured to guide the molten filler material entering from the internal volume of the proximal body portion to flow parallel to a longitudinal axis of the nozzle and away from the proximal body portion; and
a distal body portion comprising a flow-redirecting surface configured to divert a longitudinal flow of the molten filler material to flow radially outward from the nozzle,
wherein a portion of the flow-redirecting surface of the distal body portion and a portion of the intermediate body portion define a circular circumferential orifice.

12. The apparatus as recited in claim 11, wherein the intermediate body portion of the nozzle comprises an outer circumferential wall having a circular terminal portion, and a portion of the intermediate body portion that partly defines the circular circumferential orifice comprises the circular terminal portion of the outer circumferential wall.

13. The apparatus as recited in claim 12, wherein the intermediate body portion of the nozzle further comprises:
an inner circumferential wall; and
a plurality of radial spacers that maintain separation between the inner circumferential wall and the outer circumferential wall,
wherein the longitudinal melt channels are defined by respective portions of an inner surface of the outer circumferential wall, by respective portions of an outer surface of the inner circumferential wall, and by respective surfaces of respective pairs of radial spacers.

14. The apparatus as recited in claim 12, wherein the flow-redirecting surface of the distal body portion of the nozzle is a circumferential surface of revolution having a diameter that increases continuously to a maximum diameter of the distal body portion that is greater than an outer diameter of the outer circumferential wall.

15. The apparatus as recited in claim 11, further comprising:
a recycling pump in fluid communication with the reservoir;
a pipe in fluid communication with the recycling pump; and
an end cap in fluid communication with the pipe, wherein the end cap is configured to sit atop the hole in a composite material and cover a volume of space that is in fluid communication with the pipe and have an opening through which a portion of the nozzle is passed.

16. The apparatus as recited in claim 11, further comprising:
a retraction mechanism for retracting the nozzle; and
a control computer configured with programming for controlling a rate of rotation of the pump assembly and a rate of displacement of the retraction mechanism during a filling operation.

17. The apparatus as recited in claim 11, further comprising a heating element disposed inside the nozzle.

18. An apparatus for injecting molten filler material into a hole, the apparatus comprising:
a reservoir for storing the molten filler material that is electrically conductive;
a pump assembly in fluid communication with the reservoir;
a rotary nozzle in fluid communication with the pump assembly for receiving the molten filler material pumped from the reservoir and ejecting the molten filler material; and
a motor for driving rotation of the rotary nozzle,
wherein the rotary nozzle comprises a circular cylindrical intermediate body portion having an internal channel system and a plurality of side openings that are circumferentially distributed and extend a length of the circular cylindrical intermediate body portion and allow the molten filler material to flow radially outward from the rotary nozzle, and wherein the plurality of side openings are linear or the plurality of side openings are helical.

19. The apparatus as recited in claim 18, further comprising respective pairs of beveled projections disposed at opposite edges of each side opening.

20. The apparatus as recited in claim 18, further comprising a control computer configured with programming for controlling a rate of rotation of the pump assembly and a rate of rotation of the rotary nozzle during a filling operation.

21. A structural assembly for an aircraft, the structural assembly comprising:
a composite layer having a hole with a relatively rough surface that has concavities; and
a coating adhered to the relatively rough surface of the hole and filling the concavities, the coating defining a smooth circular cylindrical surface of a coated hole, which smooth circular cylindrical surface circumscribes an empty space,
wherein the composite layer comprises fibers made of electrically conductive material and the coating comprises an electrically conductive low-melting alloy.

* * * * *